Nov. 15, 1927.
G. H. CASPER ET AL
1,649,288
CAN SOLDERING MACHINE
Filed June 4, 1923
3 Sheets-Sheet 1
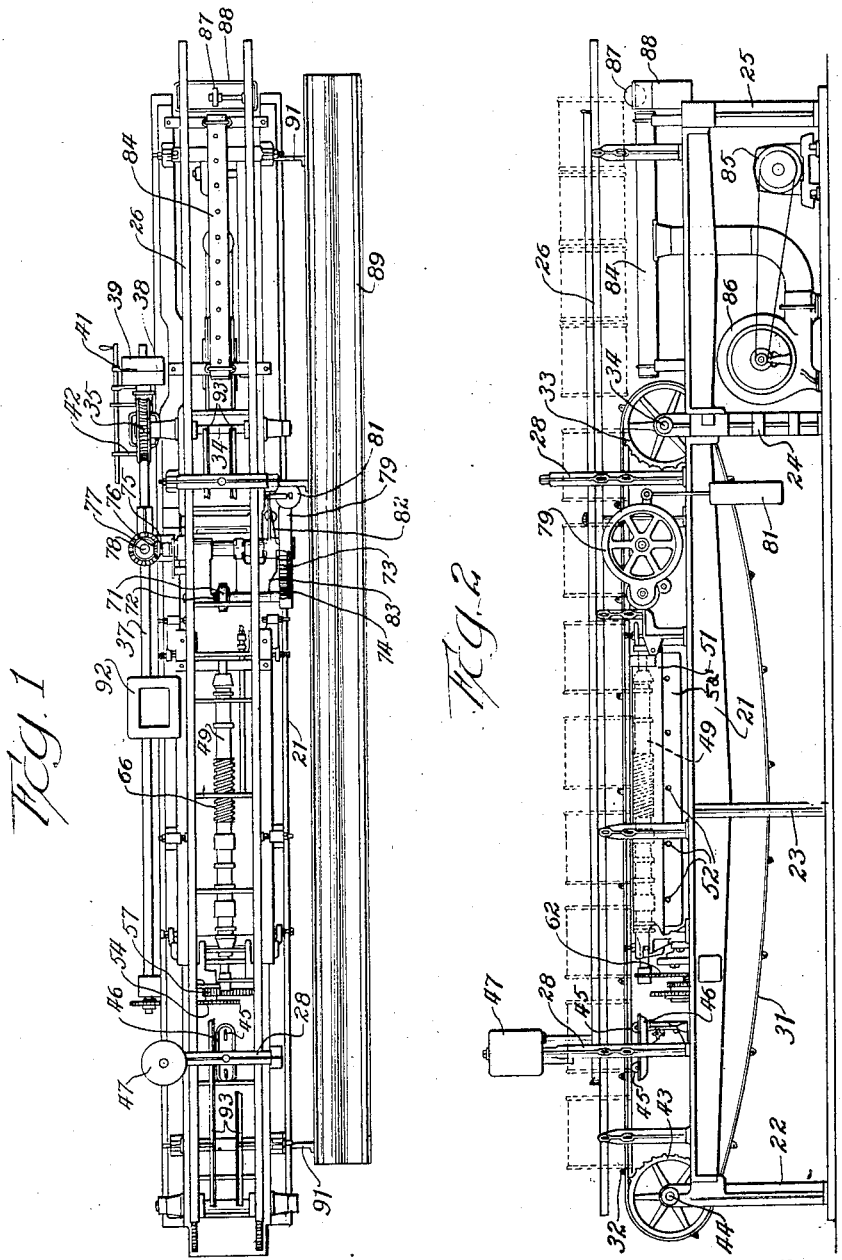

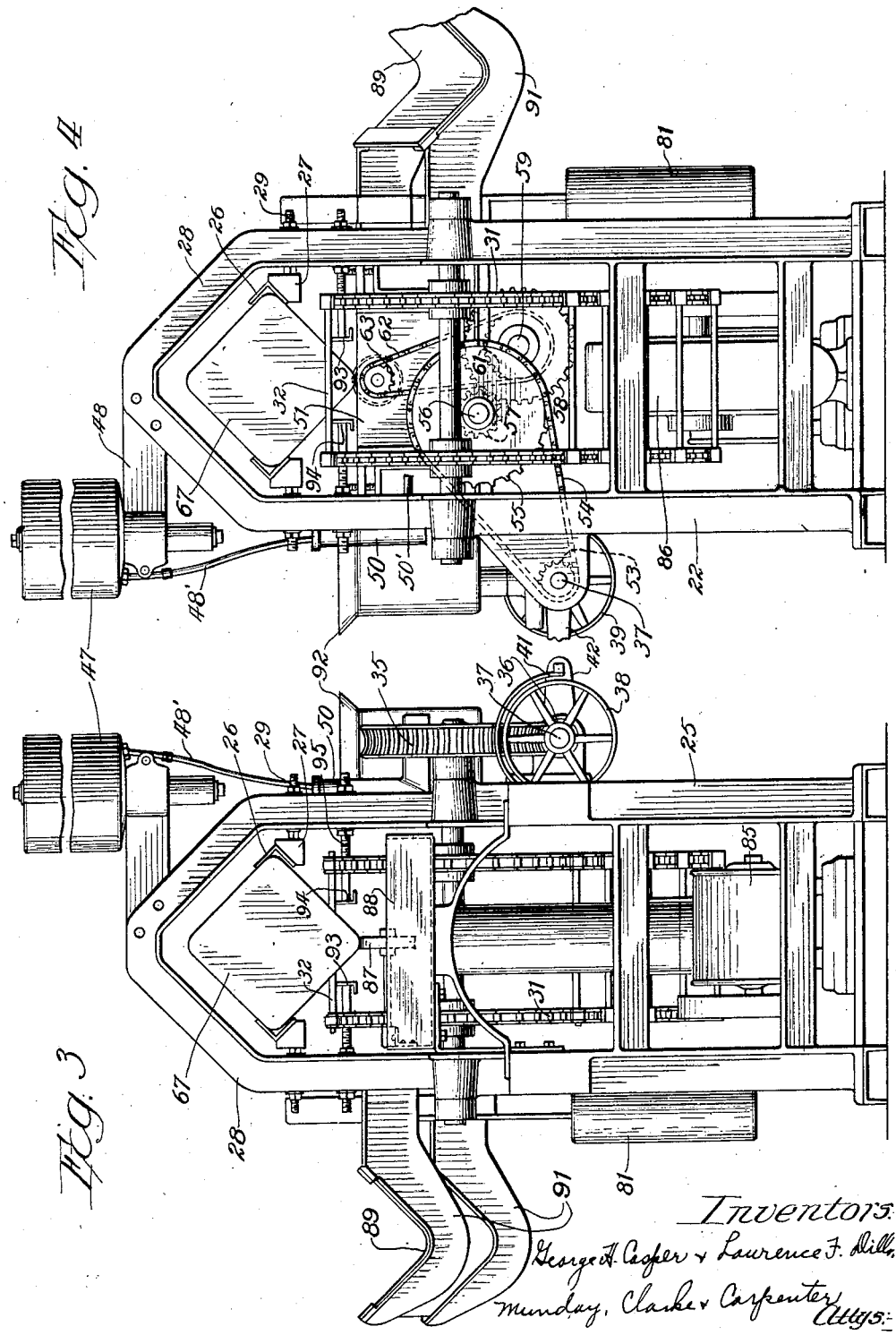

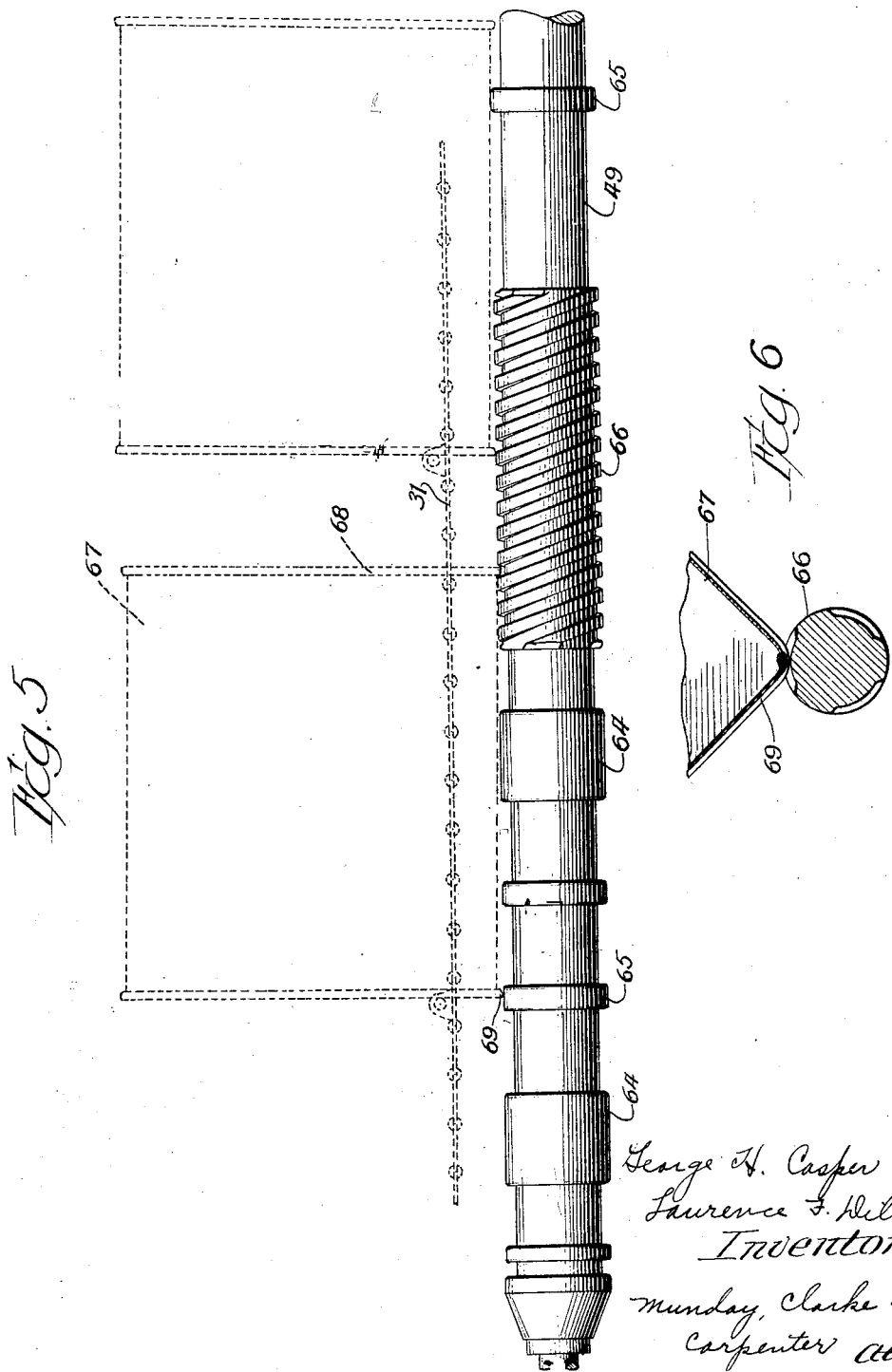

Patented Nov. 15, 1927.

1,649,288

UNITED STATES PATENT OFFICE.

GEORGE H. CASPER, OF MAYWOOD, AND LAURENCE F. DILLON, OF MELROSE PARK, ILLINOIS, ASSIGNORS TO AMERICAN CAN COMPANY, OF NEW YORK, N. Y., A CORPORATION OF NEW JERSEY.

CAN-SOLDERING MACHINE.

Application filed June 4, 1923. Serial No. 643,177.

The present invention relates to can soldering machines and more particularly to such machines adapted for the soldering of a side seam of a rectangular can, such as the well-known five-gallon oil can.

A principal object of the invention is the provision in a machine of this character of means for insuring complete application of solder to all parts of the side seam, especially to the parts of said seam adjacent the can ends, it having been quite a commonly experienced difficulty in the past to find these parts of the seam insufficiently soldered, or not soldered at all, due to failure of the solder applying member of the machines used to properly contact with the can close to the ends.

Another object of the invention is the provision of means for accomplishing the foregoing result, which will not add materially to the cost of manufacture and which will not involve very great structural changes in the type of soldering machines now commonly in use.

Other objects and advantages of the invention will be apparent as it is better understood from the following description, which, taken in connection with the accompanying drawings, discloses a preferred embodiment thereof.

Referring to the drawings,

Figure 1 is a plan view of the soldering machine in which our invention is embodied;

Fig. 2 is a side elevation thereof, certain parts being omitted for convenience in illustration;

Fig. 3 is an end elevation, showing the discharging end of the machine;

Fig. 4 is an end elevation, showing the opposite, or feed, end of the machine;

Fig. 5 is an enlarged detail view of the soldering roll, the different positions of the cans as they are fed lengthwise of said roll being indicated in dotted lines; and Fig. 6 is a detail sectional view of the threaded portion of the roll, showing the manner in which this acts upon the can body.

The apparatus thus illustrated comprises a relatively long supporting frame 21, supported from the floor by means of uprights 22, 23, 24 and 25, this frame having mounted thereon soldering and can conveying mechanism to be hereinafter described.

The cans are delivered in any desired manner into angle iron track members 26, which are secured to blocks 27 extending inwardly from frame brackets 28 to which they are secured by means of bolts 29. Said cans are propelled along said track members 26 by means of a chain conveyer 31 having cross bars 32 thereon adapted to engage the rear end of a can as the conveyer is moved beneath said tracks 26. Said conveyer is driven by means of sprockets 33 mounted on a shaft 34 having bearings in the upper ends of the uprights 24, said shaft being driven by means of a worm wheel 35 carried on the outer end thereof and meshing with a worm 36 carried on or formed integrally with a longitudinal shaft 37, which latter is provided with tight and loose pulleys 38 and 39. A driving belt (not shown) is adapted to be moved from one to the other of said pulleys by means of a belt shifter 41 mounted in brackets 42 extending laterally from the frame. Said conveyer is directed over idle sprockets 43 mounted on a shaft 44 in the uprights 22 at the feeding end of the machine.

As the cans are moved forwardly by the conveyer, they pass first over acid rolls 45, rotatably mounted in an acid receptacle 46, which is supplied from a vessel 47 supported from one of the brackets 28 by means of projecting arms 48. A pipe 48' leads from said vessel to a cylinder, or cup, 50, which communicates through a pipe 50' (shown fragmentarily in Fig. 4) with the said acid receptacle.

The cans are next passed above a soldering roll 49, which is positioned lengthwise and rotatably mounted in a receptacle 51 adapted to contain molten solder, which may be heated in any suitable manner, as by gas burners beneath said receptacle. Apertures 52 are provided in aprons 52' depending from the receptacle and permit inspection of the burners, which are disposed between said aprons.

Said roll 49 is adapted to be driven from the shaft 37 in manner perhaps best shown in Fig. 4. A sprocket 53 is provided on said shaft 37 and drives a sprocket chain 54, extending over a larger sprocket 55 on a short longitudinal shaft 56. Said shaft carries also a gear 57 meshing with a gear 58 on a second short shaft 59, which shaft carries a sprocket wheel 61 driving a sprocket chain 62 taking over a sprocket 63 on the end of the roll 49. In this manner, said roll is continuously rotated and serves to apply solder to the can side seam, as will be readily understood.

Referring now to Fig. 5, it will be observed that the roll 49 is provided with projecting portions 64 and 65, which are adapted to contact with the can bodies and apply solder carried up from the receptacle to the body side seams. Difficulty has been experienced in the use of soldering machines employing an applying roll of this general type, by reason of the fact that the can has been moved so rapidly over the roll that the latter, as formed, could not properly contact with the front edge of the seam, which, for this reason, was left imperfectly soldered. We, therefore, provide means, to be now described, which obviates this difficulty and insures thorough application of solder to all parts of the seam.

A spiral, or helical, projection 66 is provided upon the roll 49 and, in the present instance, consists of a triple thread, as is clearly shown in Fig. 6. This thread is formed so that when the roll 49 is rotated, the thread turns in the direction of travel of the cans, but at a slower speed. The cans 67 have one or more end members 68 positioned thereon when they are fed into the machine. These end members, which are at this time clenched in position, but not soldered, project laterally beyond the edge of the can body, this being due to a slight taper or rounding in the form of the seam, as well as to the thickness of the metal. The projecting ends may be readily seen in Figs. 5 and 6 of the drawings and are indicated by the reference character 69. Upon a can reaching the projection 66, said projecting edge 69 is positioned upon the surface of one of the threads and rides thereon until the greater speed of travel of the can causes said edge to drop into one of the grooves between the threads, as shown at the left in Fig. 5. The threads, or teeth are projections on the roll 49 and do or may form corner portions adapted to work in the angle between the body and end member of the can and are beveled back on their edges and the pitch is such as to provide the desired relationship with the can body edge, so that said edge is allowed to tip down, in the present instance, three times while crossing the spiral projection. This is a slow movement and causes solder to be brought up in such manner as to be thoroughly applied to the front part of the seam, which is at the corner of the can. Continued movement of the can, after the edge has first dropped down, brings such edge upon the tooth surface and it is held in elevated position until it again rides off, in the manner heretofore stated.

By the above or other equivalent constructions the solder roll is formed with a series of recesses, the spaces between the threads, into which the projecting edge of an end member of a can may drop for the reception of solder on the seam as above described.

After being moved beyond the roll 49, the cans are acted upon by a wiper member 71, which is in the form of a roll and is mounted upon a transverse shaft 72. Said roll is driven from the shaft 37 by means of a large gear 73 meshing with a pinion 74 upon said shaft, said gear 73 being carried upon a second transverse shaft 75, which has, at its opposite end, a bevel gear 76 meshing with a larger bevel gear 77 upon a short vertical shaft 78, the latter being driven by a suitable gear connection with said shaft 37. The gears 73 and 74 are enclosed in a casing 79 and it will be observed that the roll 71 is forced upwardly into operative position by means of a weight 81 suspended from an arm 82 formed integrally with a bracket 83 having bearings on the shaft 75 and carrying the shaft 72 in the opposite end thereof.

The tracks 26 extend above a blower 84, which is operated by means of a motor 85 driving suitable fan mechanism contained within a housing 86.

Beyond said blower 84, there is provided a water cooling roller 87, which revolves in a water receptacle 88 under the influence of the cans, which are at this point in the tracks moved forwardly with a step motion by successive cans delivered from the conveyer 31.

The soldered cans are adapted to be received by an operator at the discharging end of the machine and positioned in a trough 89, which is supported by side brackets 91 arranged, in the present instance, in inclined relationship to facilitate the movement of the cans therein.

While solder may be supplied to the receptacle 51 in any suitable manner, we provide, for this purpose, a pot or receiving hopper 92, which is supported from the side of the machine and communicably connected with said receptacle. A burner (not shown) is provided beneath the hopper 92 to heat the solder which, in molten condition, then runs into said receptacle 51 to supply a bath which is maintained therein.

It will be noted that a slight play is provided for the corners of the can in the tracks 26, which permits the tipping action caused by the spiral thread 66, for the purpose hereinbefore stated.

The conveyer 31 is guided by means of angle iron track members 93 upon the top of which the cross bars 32 ride. Said track members are suitably secured to the inner ends 94 of bolts 95, which extend inwardly from the frame brackets 28.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

We claim:

1. In a can soldering machine, the combination of a conveyer adapted to carry can bodies in horizontal position through the machine, and a rotatable soldering member mounted beneath said conveyer and adapted to apply solder to a side seam in the can body, said member having means thereon for controlling the position of the can to insure thorough application of solder to all parts of said side seam.

2. In a can soldering machine, the combination of a conveyer adapted to carry can bodies in horizontal position through the machine, and a rotatable soldering member mounted beneath said conveyer and adapted to apply solder to a side seam in the can body, said member having means thereon for tipping an end of the can downwardly during its course of travel over said member to insure thorough application of solder to the end parts of the seam.

3. In a can soldering machine, the combination of a conveyer adapted to carry can bodies in horizontal position through the machine, and a rotatable soldering member mounted beneath said conveyer and adapted to apply solder to a side seam in the can body, said member having a helical thread thereon adapted to contact with a part of the can and to tip the latter downwardly during its course of travel across said member to insure thorough application of solder to the end part of the seam.

4. In a can soldering machine, the combination of a conveyor adapted to carry can bodies in horizontal position through the machine, and a rotatable soldering member mounted beneath said conveyer and adapted to apply solder to a side seam in the can body, said member having a beveled helical thread thereon adapted to lower the end part of the can in contact therewith during the course of travel of the can across said member to insure thorough application of solder to the end part of the seam.

5. In a can soldering machine, the combination of a receptacle for molten solder, a soldering roll mounted in said receptacle, a conveyer movable above said roll and adapted to carry cans in horizontal position with the side seams thereof in contact with the roll, said roll being provided with projections on said soldering means having corner portions extending outwardly along the flange formed by the applied can end for controlling the position of a can to insure thorough application of solder to all parts of the side seam thereof, the flange of the can entering between said portions and being rubbed with solder thereby.

6. In a can soldering machine, the combination of means for conveying rectangular can bodies in horizontal position through the machine, means for applying molten solder to a side seam in a can body as the latter is moved by said conveyor, and projections on said soldering means having corner portions extending outwardly along the flange formed by the applied can end means for varying the angular position of the can body during the application of solder to said seam to insure thorough soldering of all the parts of the seam, the flange of the can entering between said portions and being rubbed with solder thereby.

7. In a can soldering machine, the combination of means for conveying flanged rectangular can bodies in horizontal position, rotatable means for applying solder to a body side seam, and means adapted to act upon the flange of a body to tip the latter downwardly whereby to facilitate application of solder to the portion of the seam adjacent said flange.

8. In a can soldering machine, the combination of means for conveying flanged rectangular can bodies in horizontal position, rotatable means for applying solder to a body side seam, and means adapted to act upon the flange of a body to tip the latter downwardly at predetermined intervals during its travel through the machine whereby to facilitate application of solder to the portion of the seam adjacent said flange.

9. In a can soldering machine, the combination of a conveyer adapted to carry can bodies in horizontal position through the machine, and a rotatable soldering member mounted beneath said conveyer and adapted to apply solder to a side seam in the can body, said member having a helical thread thereon producing a linear surface speed different from the speed at which the can is propelled and causing said can to tip slowly downwardly at times between said threads whereby solder is thoroughly applied to an end part of the seam.

10. In a can soldering machine, the combination of a conveyer adapted to carry can bodies in horizontal position through the machine, and a rotatable soldering member mounted beneath said conveyer and adapted to apply solder to a side seam in the can body, said member having a plurality of helical threads thereon producing a linear surface speed different from the speed at which the can is propelled and causing said can to tip slowly downwardly at times between said threads whereby solder is thoroughly applied to an end part of the seam.

11. In a can soldering machine, the combination of a conveyer for square cans, a roll having helical projections formed with corner portions for applying solder to a body seam at the corner of the can, and means for controlling the can position in such manner as to insure thorough application of solder to the seam at the front corner of said can, the flange of the can entering between said portions and being rubbed with solder thereby.

12. In a can soldering machine, the combination of a solder applying roll, a conveyer adapted to move cans wth the side seams thereof passing over said roll, and a helix on said roll for insuring thorough soldering of the forward portion of the seam.

13. In a can soldering machine, the combination of a solder applying roll having helically arranged recesses into which may drop the projecting edge of an end member of a can, and a conveyer adapted to move cans with the side seams thereof passing over said roll.

GEORGE H. CASPER.
LAURENCE F. DILLON.